United States Patent [19]

Andersson

[11] 4,445,582

[45] May 1, 1984

[54] TRACK UNIT OF BOGIE TYPE

[75] Inventor: Albert Andersson, Frösön, Sweden

[73] Assignee: Skega AB, Ersmark, Sweden

[21] Appl. No.: 348,728

[22] Filed: Feb. 16, 1982

[30] Foreign Application Priority Data

Feb. 17, 1981 [SE] Sweden .............................. 8101063

[51] Int. Cl.³ .............................................. B62D 55/00
[52] U.S. Cl. ...................... 180/9.5; 180/9.1;
   180/9.32; 180/24.05; 305/38
[58] Field of Search ...................... 180/9.5, 9.32, 9.21,
   180/9.23, 9.26, 9.42, 9.62, 9.64, 9.1, 24.05, 0.11,
   0.12, 0.13; 280/28.5; 305/35 R, 38

[56] References Cited

U.S. PATENT DOCUMENTS

| | | | |
|---|---|---|---|
| 2,296,659 | 9/1942 | Bates et al. | 180/9.5 |
| 3,442,345 | 5/1969 | Berger | 180/24.05 |
| 3,582,155 | 6/1971 | Marier | 305/38 |
| 3,747,718 | 7/1973 | Gauchet | 180/9.1 |
| 4,072,203 | 2/1978 | Pierson | 180/9.5 |

Primary Examiner—Joseph F. Peters, Jr.
Assistant Examiner—Donn McGiehan
Attorney, Agent, or Firm—Cushman, Darby & Cushman

[57] ABSTRACT

This invention relates to a track unit intended for endless tracked cross-country vehicles, for example forestry working machines, comprising at least one driven track driven from a driven axle of the vehicle. In order to render possible the driving of forestry working machines with tracks of rubber, which are much more sparing for the ground than steel tracks, but do not possess the tensile strength of steel tracks, the present track unit of bogie type distributes the driving force on several tracks and comprises two track stands (9), each of which comprises a track (8) supported on two wheels (38,39) and driven via of these wheels (38,39), which track stands (9) are mounted between the axles (40,41) of their wheels each at one end of a rocker arm (5), which in its turn is located freely pivotally between its ends on the drive axle (4) of the vehicle, between which drive axle and the drive wheel axle (40) of each track stand a chain transmission (12,13,14,37) is located.

6 Claims, 9 Drawing Figures

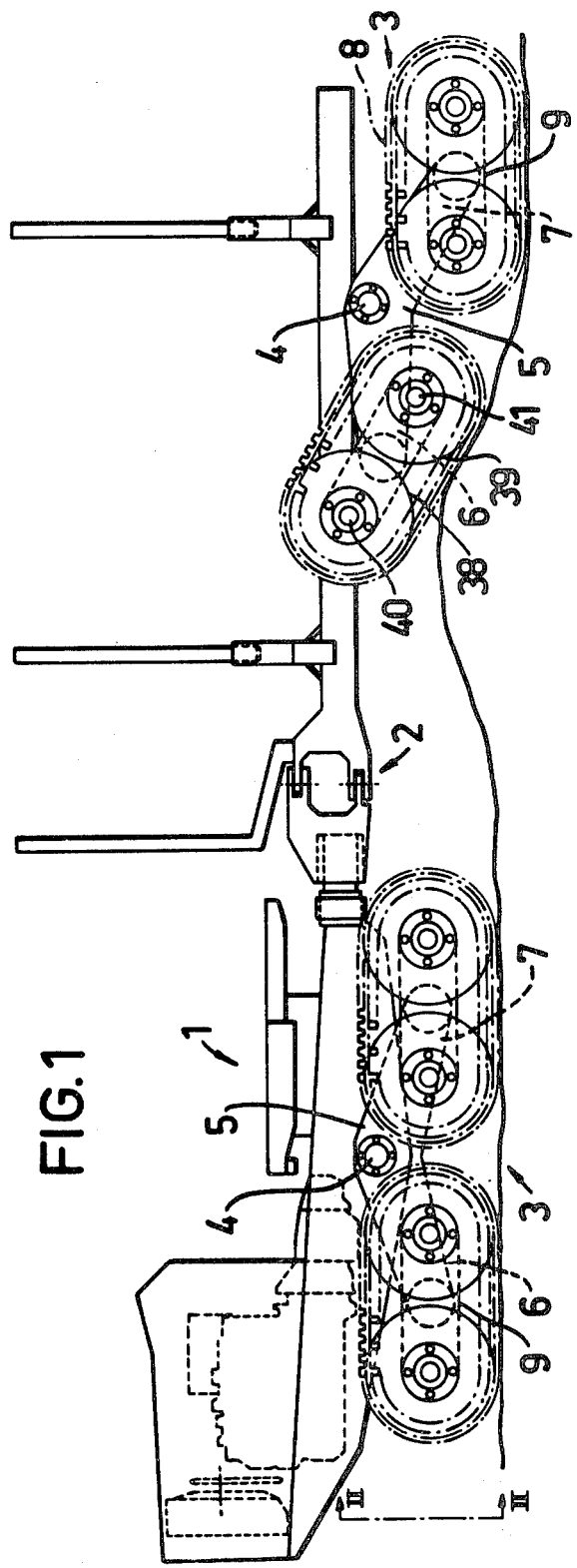

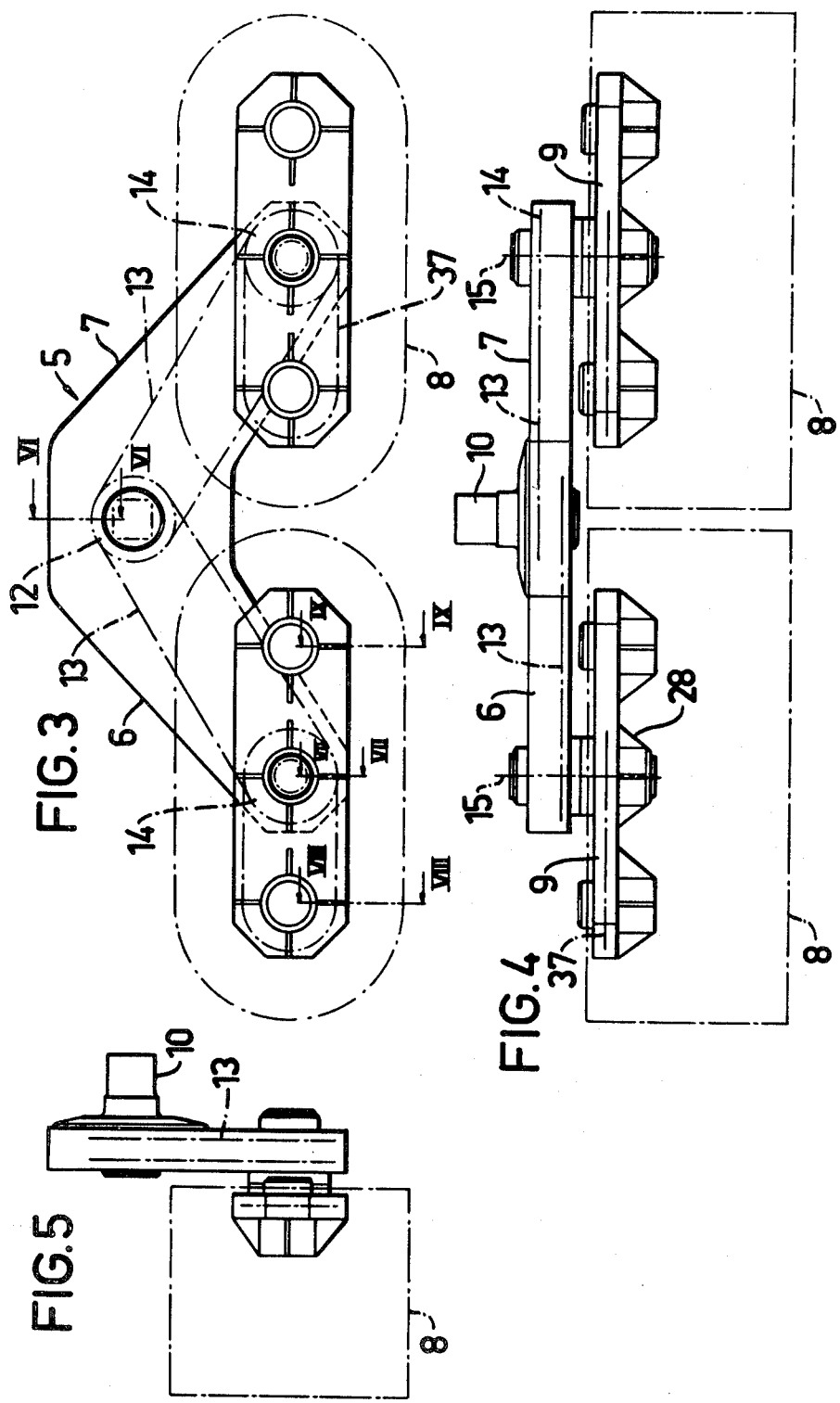

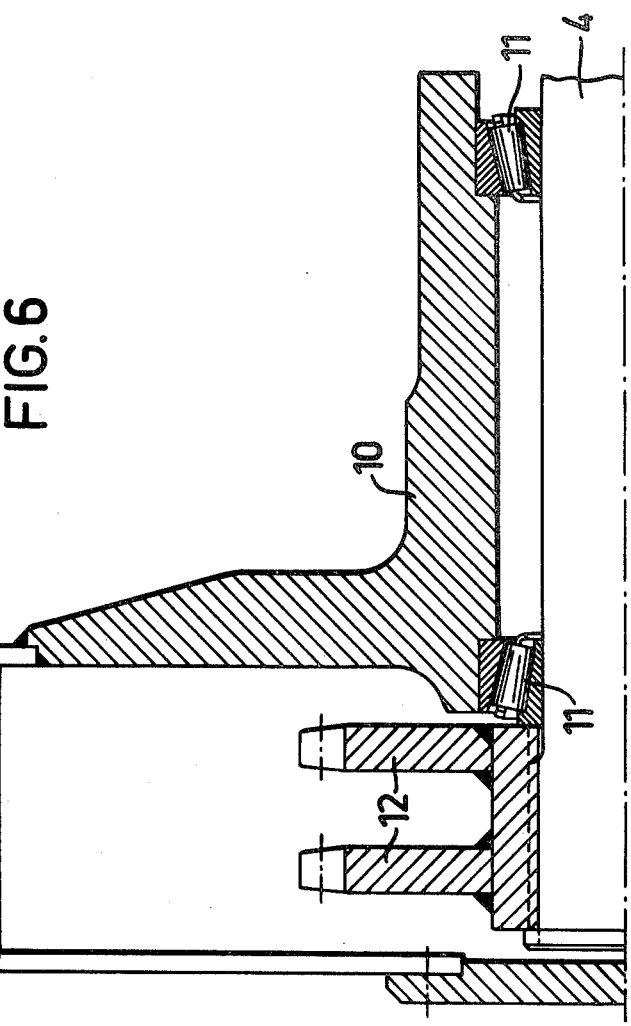

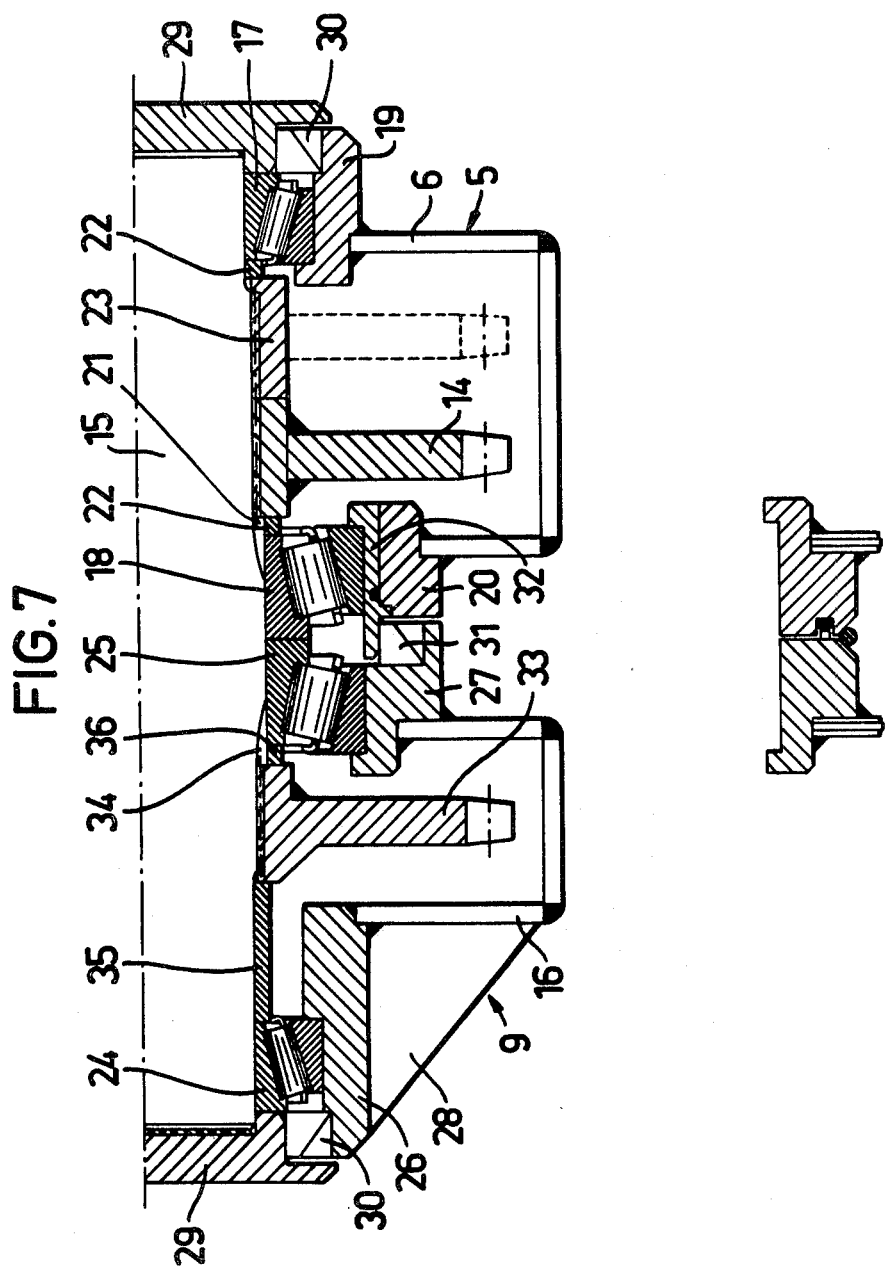

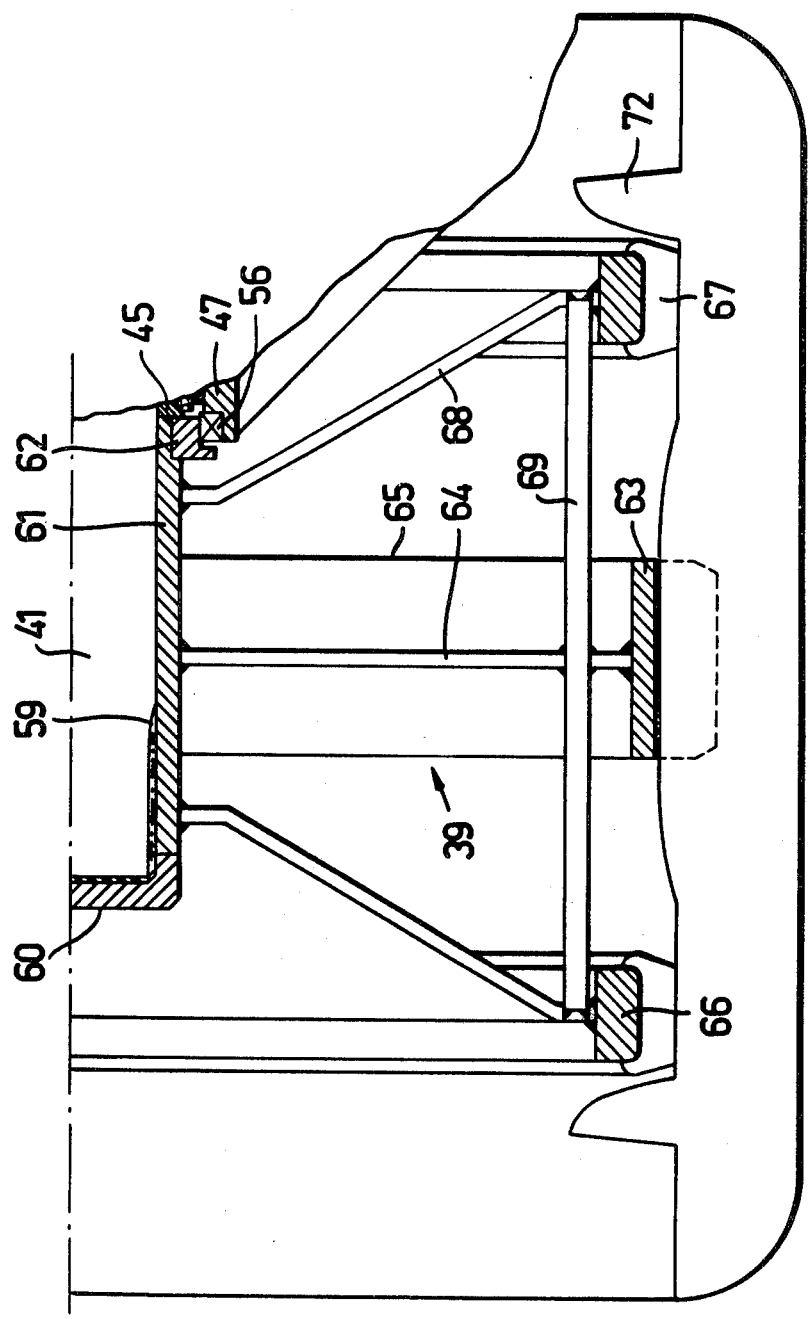

TRACK UNIT OF BOGIE TYPE

This invention relates to cross-country endless track driver vehicles, more precisely to a track unit for such vehicles comprising at least one driven track, which is driven from a driven axle of the vehicle.

BACKGROUND AND SUMMARY OF THE INVENTION

In forestry, as known, working machines of various types are employed, which normally are wheeled and give rise to considerable lasting damages of the ground, for example in the form of deep wheel furrows. In order to prevent such ground damages, attempts have been made to manufacture endless-tracked forestry machines, but without appreciable success. This failing success has its reason to a large extent in the fact, that the tracks, which are particularly suitable for this purpose, viz. rubber tracks, which expose the ground to much less strain than, for example, steel tracks of the kind employed on excavators and the like, do not possess the tensile strength required for resisting the stresses they are subjected to when being mounted on known conventional track units.

The present invention, therefore, has the object of producing an improved track unit of bogie type, which renders it possible to distribute the driving force on several tracks of short length, and which shall be designed so as to permit the tracks to the greatest possible extent to follow the ground surface without being appreciably affected by the other tracks, even when these move over an obstacle in the form of a stone, stump or the like.

This primary object of the present invention is achieved in that the track unit has been given the characterizing features defined in the attached claims. More precisely, one characterizing feature of the invention is that the unit comprises two track stands, each of which comprises one track supported on two wheels and driven by one of the wheels, which stands are supported freely pivotally between the axles of their wheels each at the end of a rocker arm, which in its turn is supported freely pivotally between its ends on the drive axle of the vehicle, from which the respective track is driven via chain transmissions.

A vehicle equipped with track units according to the invention can be designed relatively narrow, without great risk of overturning when passing with one track unit over an obstacle, because the track stands of each unit move independently of the other track stand in the unit, and at the same time the rocker arm of the unit is permitted to pivot about its axis which thereby is caused to increase in height much less than the height of the obstacle.

BRIEF DESCRIPTION OF THE DRAWINGS

The invention is described in greater detail in the following, with reference to the accompanying drawings, in which FIG. 1 is a lateral view of a vehicle chassis equipped with track bogies according to the invention, FIG. 2 is an end view of the chassis substantially along the line II—II in FIG. 1, FIGS. 3–5 are schematic lateral and, respectively, horizontal and end views of a track bogie according to the invention, FIG. 6 is a section substantially along the line VI—VI in FIG. 3, FIG. 7 is a section substantially along the line VII—VII in FIG. 3, FIG. 9 is a section substantially along the line IX—IX in FIG. 3.

DETAILED DESCRIPTION

Figure 8:
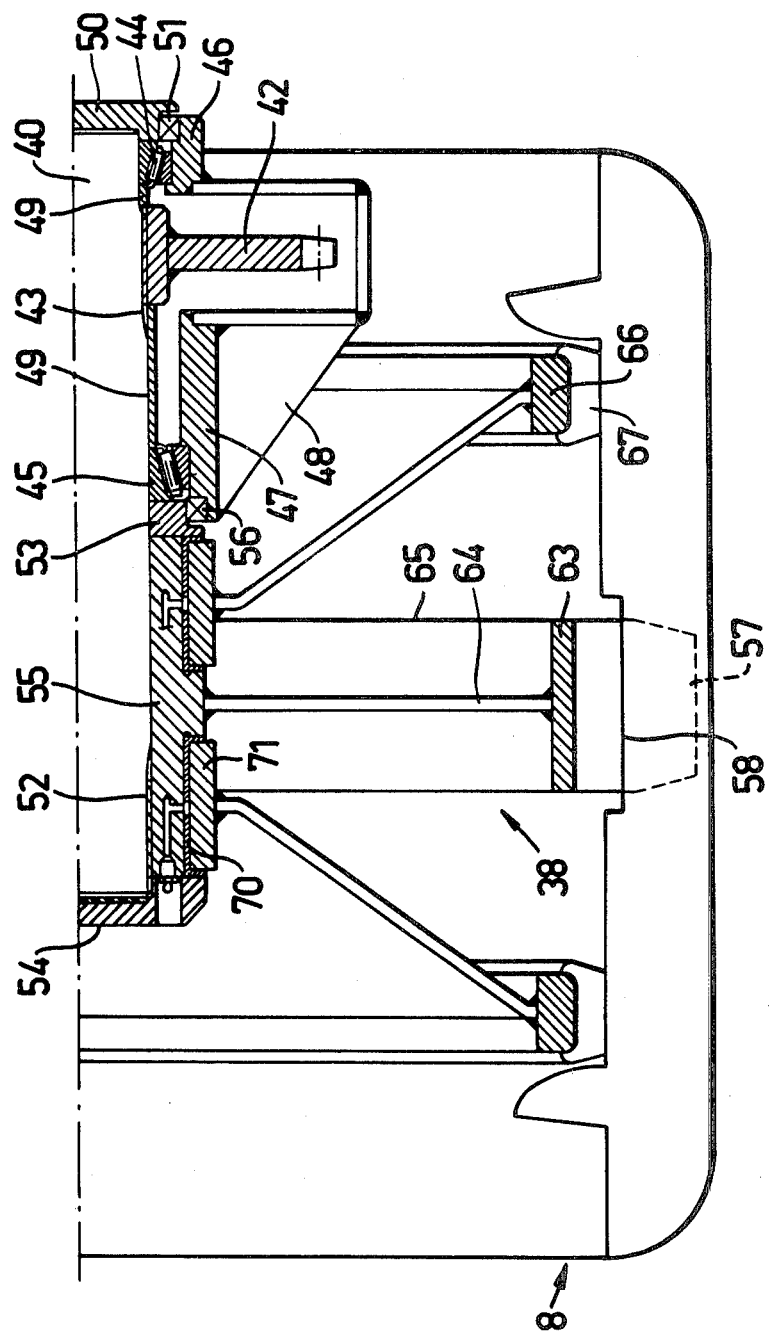
FIG. 8 is a section substantially along the line VIII—VIII in FIG. 3.

In the drawings, the numeral 1 designates generally a vehicle chassis articulated at 2, with driven track bogies 3 according to the invention which are suspended freely pivotally at the ends of the front and rear driven axles 4 of the vehicle, i.e. the driven front and rear axle of the vehicle. Each track bogie 3 according to the invention comprises a rocker arm 5 with two legs 6,7 of box beam design arranged substantially in V-shape, and two track stands 9 provided with driven tracks 8 and supported freely pivotally at the end of the legs 6 and 7 each of its rocker arm.

The rocker arm 5 of each track bogie comprises a hub sleeve 10, by which the rocker arm is supported freely pivotally on the end of its drive axle 4 by means of bearings 11, as shown in FIG. 6. On the drive axle 4 two sprockets 12 for two drive chains 13 are attached, of which one chain is located within the forward directed leg 6 of the rocker arm and co-operates with a sprocket 14 on the track stand drive axle 15 of the forward track stand, which axle is mounted in the leg 6 for driving the track 8 of the forward track stand, while the second drive chain 13 is located in the rearward directed leg 7 of the rocker arm and co-operates with a sprocket 14 on the drive axle 15 of the track stand, which axle is mounted in the leg 7 for driving the track 8 of the rear track stand.

Each track stand 9 comprises a frame in the form of a box beam 16, which is supported freely pivotally between its ends on the drive axle 15 of the track stand, which axle is mounted in the rocker arm 5 as shown in FIG. 7. In said rocker arm 5 said drive axle 15 is supported by means of bearings 17 and 18 of a suitable type for receiving arising axial and radial loads, which bearings are located in sleeve-like bearing holders 19 and, respectively, 20 on each side of the rocker arm 5. Between these bearings, the sprocket 14 is mounted on the axle 15 by splines 21. The sprocket 14 is retained in position on the axle by means of support rings 22 and a distance sleeve 23, which at the forward track stand 9 is located between the sprocket 14 and the outer bearing 17, and at the rear track stand is located between the sprocket 14, indicated in FIG. 7 by dashed lines, and the inner bearing 18.

In the frame 16 of the track stand the axle 15 is mounted by means of bearings 24 and 25 of, in principle, the same type as the bearings 17 and 18. Said bearings 24,25 are located in sleeve-like bearing holders 26 and, respectively, 27 on each side of the frame 16, in such a manner, that the bearing holder 26 on the outside of the frame is supported by a plurality of triangular support springs 28. As protection of the outer bearings 17 and 24, bearing caps 29 are screwed on the ends of the axle, between which caps and the respective bearing holders 19 and 26 bearing sealings 30 are located. A similar bearing sealing 31 also is located between the frame 16 of the track stand and the rocker arm 5, for example in one of the end surfaces facing toward each other of the bearing holders 20 and 27. For retaining the bearing sealing 31, at the embodiment shown in FIG. 7 a locking sleeve 32 is located between the bearing 18 and its bearing holder 20, which sleeve 32 extends inward over the sealing 31 and retains the same in position.

Within the frame 16 of the track stand, on the axle 15 between the bearings 24 and 25 a sprocket 33 is mounted by means of splines 34, which are retained in position on the axle 15 on one side by means of a distance sleeve 35 and on the other side by means of a support ring 36. Said sprocket 33 is capable by means of a chain 37 (FIGS. 3–5) to drive the track 8 of the track stand, which track is supported on two wheels 38 and 39, the axles 40 and, respectively, 41 of which are mounted in the frame of the track stand each on one side of the pivot axle 15 of the trackstand, via one of said wheels, preferably the forward one as shown in FIGS. 1–5. The axles 40 and, respectively, 41 of the wheels 38 and 39 may be located at equal or different distance from the pivot axle 15 of the track stand, and preferably the axle 40 of the forward, driven wheel is located at a greater distance from the pivot axle 15 than the axle 41 of the rear, non-driven wheel. In the drawings, the wheel axles 40,41 of the track stand are shown located with their centre in a diametric plane through the pivot axle 15 of the track stand, but they advantageously may be located displaced upward from said diametric plane by almost one tenth of the diameter of the wheels, thereby improving the climbing properties of the bogie.

For driving the forward wheel 38 of the track stand, a sprocket 42 co-operating with the chain 37 is attached by means of splines 43 on the axle 40 of the forward wheel. Said axle 40 is mounted in the frame 16 of the track stand by means of bearings 44 and 45 of a type suitable for receiving arising axial and radial loads. Said bearings 44,45 are located in sleeve-like bearing holders 46 and 47 on the sides of the frame, and the bearing holder 47 facing to the track wheel 38 is stayed outwardly by means of triangular support springs 48. The sprocket 42 is retained in position on the axle 40 by means of distance sleeves 49 located on both sides of the sprocket. As protection of the outer bearing 44 a bearing cap 50 is screwed on the end of the axle 40, between which cap and the bearing holder 46 a sealing 51 is located.

The forward, driven wheels 38 of the track stand are attached on their axle 40 by means of splines 52 and are retained in position on the axle by a support ring 53 against the bearing 45 and by a support cap 54 abutting the hub 55 of the wheel. Between the support ring 53 and the bearing holder 47 a sealing 56 is located.

The wheel 38 is provided in known manner with cogs 57 on its periphery for engaging drivingly with drive bars 58 located in the track between cog spaces formed in the track. The rear wheel 39 of the track stand also is provided with similar cogs 57. Said wheel 39 is mounted on its axle 41 by means of splines 59, which axle is mounted in the frame 16 of the track stand in the same way as the axle 38 by means of two bearings 44 and 45, of which only the inner bearing 45 is shown in FIG. 9. The wheel 39 is retained in position on its axle 41 by means of a support cap 60 screwed on the end of the axle. The hub 61 of the wheel 39 is shown in FIG. 9 abutting directly the bearing 45 and provided with a holder ring 62 for the sealing 56 located in the bearing holder 47. The wheels 38 and 39 are shown comprising a cogged wheel 63 provided with the cogs 57, which wheel is supported by a rim disc 64, which is connected to the hub and reinforced by spokes 65 in parallel with the axle.

For distributing the load on the track 8 of the track stand, which track preferably may consist of rubber or similar material with cast-in longitudinal metal reinforcement for taking up tensile forces, especially in the drive bars 58, the wheels 38 and 39 are provided with support rings 66 located on both sides of the cogged wheels 63 and abutting support strips 67 located on the inside of the track. Owing to this three-point support of the track, the track is prevented from deflecting inward at its edges and, therefore, is maintained plane. As a result thereof, its gripping power is increased and the risk of fatigue is reduced considerably. The support rings 66 are supported by angularly bent spokes or rim disks 68, which in FIG. 9 are shown directly connected to the hub of the wheel and stayed relative to each other by stay members 69, which extend through the rim disk 64 and are connected therewith, and which in FIG. 8 are shown connected to slide rings 71, which are located on the hub of the wheel in split lubricated slide bearings 70.

In FIGS. 8 and 9 is shown that it is possible within the scope of the present invention to design the track 8 in various ways at least with respect to the portion co-operating with the cogs of the wheels. The tracks preferably are provided with guide tongues 72 located on the outside of the support strips 67 and may on their side facing to the ground be provided in a manner known per se with transverse ridges increasing the gripping capacity.

The present invention is not restricted to what is described above and shown in the drawings, but can be altered, modified and completed in many different ways within the scope of the invention idea defined in the attached claims.

What I claim is:

1. A track unit for an endless track driven vehicle having a driven axle, said unit comprising: a rocker arm freely pivoted between its ends on the driven axle; two track stands each including a frame, a forward track wheel and an aft track wheel rotatably mounted in said frame and an endless track supported on the track wheels, each track stand frame being freely pivotably mounted at a location between its respective track wheels on a track stand axle on one end of the rocker arm; and chain transmission means including a chain drive between said driven axle and said track stand axle and between said track stand axle and one wheel of the respective track wheel.

2. A track unit as in claim 1 wherein the driven track wheel of each track stand is driven.

3. A track unit as in claim 1 wherein each track stand axle is located at equal distances from the axles of its respective track wheels.

4. A track unit as in claim 1 wherein the track wheels of each track stand are located in diametric plane through the track stand at the track stand axle.

5. A track unit as in claim 1 wherein the track wheels support the respective track at three points spaced from each other.

6. A track unit as in claim 5 wherein the track wheels are provided with support rings for cooperation with support strips located on the inside of the respective track.

* * * * *